(12) United States Patent
Dewan et al.

(10) Patent No.: US 8,157,178 B2
(45) Date of Patent: Apr. 17, 2012

(54) MANUFACTURING SYSTEM TO PRODUCE CONTACTLESS DEVICES WITH SWITCHES

(75) Inventors: Sunil Dewan, Centennial, CO (US); Brian Kean, Missouri Valley, IA (US)

(73) Assignee: First Data Corporation, Greenwood Village, CO (US)

( * ) Notice: Subject to any disclaimer, the term of this patent is extended or adjusted under 35 U.S.C. 154(b) by 1215 days.

(21) Appl. No.: 11/875,453

(22) Filed: Oct. 19, 2007

(65) Prior Publication Data

US 2009/0101720 A1    Apr. 23, 2009

(51) Int. Cl.
*G06K 19/06* (2006.01)

(52) U.S. Cl. ......................................... 235/492

(58) Field of Classification Search .............. 235/382, 235/492, 379

See application file for complete search history.

(56) References Cited

U.S. PATENT DOCUMENTS

| | | |
|---|---|---|
| 5,270,983 A | 12/1993 | Wuertz et al. |
| 5,585,787 A | 12/1996 | Wallerstein |
| 5,913,203 A | 6/1999 | Wong et al. |
| 5,937,394 A | 8/1999 | Wong et al. |
| 5,955,961 A | 9/1999 | Wallerstein |
| 5,956,699 A | 9/1999 | Wong et al. |
| 5,980,322 A | 11/1999 | Madsen et al. |
| 6,161,762 A | 12/2000 | Bashan et al. |
| 6,356,196 B1 | 3/2002 | Wong et al. |
| 6,592,044 B1 | 7/2003 | Wong et al. |
| 6,607,127 B2 | 8/2003 | Wong |
| 6,609,654 B1 | 8/2003 | Anderson et al. |
| 6,753,341 B1 | 6/2004 | King |
| 6,805,288 B2 | 10/2004 | Routhenstein et al. |
| 6,811,082 B2 | 11/2004 | Wong |
| 6,978,940 B2 | 12/2005 | Luu |
| 7,020,486 B2 | 3/2006 | Tanada et al. |
| 7,097,108 B2 | 8/2006 | Zellner et al. |
| 7,243,840 B2 | 7/2007 | Bason et al. |
| 7,762,471 B2 * | 7/2010 | Tanner ..................... 235/492 |
| 7,878,395 B2 * | 2/2011 | Adams et al. ............ 235/382 |
| 2002/0096570 A1 | 7/2002 | Wong et al. |

(Continued)

FOREIGN PATENT DOCUMENTS

WO    9814900    4/1998

(Continued)

OTHER PUBLICATIONS

PCT International Search Report and Written Opinion mailed Jan. 13, 2009, International Application No. PCT/US2008/080019, 12 pages.

(Continued)

*Primary Examiner* — Seung Lee

(74) *Attorney, Agent, or Firm* — Kilpatrick Townsend & Stockton LLP

(57) ABSTRACT

A contactless device comprises circuitry storing information, a switch having a first position and a second position, and a fusible link. When the fusible link is intact, wireless reading and writing of the information is enabled regardless of the position of the switch. When the fusible link has been parted, wireless reading of the information is enabled when the switch is in the first position, and wireless reading of the information is disabled when the switch is in the second position. The contactless device may be placed in a non-responsive state, and transformed to a responsive state by parting a second fusible link, or by transmitting an authenticating code to the device. The contactless device may be a card, or some other kind of device.

21 Claims, 4 Drawing Sheets

U.S. PATENT DOCUMENTS

| | | |
|---|---|---|
| 2002/0156802 A1 | 10/2002 | Takayama et al. |
| 2003/0055735 A1 | 3/2003 | Cameron et al. |
| 2003/0061168 A1 | 3/2003 | Routhenstein |
| 2004/0110528 A1 | 6/2004 | Aoyama et al. |
| 2004/0127256 A1 | 7/2004 | Goldthwaite et al. |
| 2005/0001712 A1 | 1/2005 | Yarbrough |
| 2005/0080747 A1 | 4/2005 | Anderson et al. |
| 2005/0082362 A1 | 4/2005 | Anderson et al. |
| 2005/0086160 A1 | 4/2005 | Wong et al. |
| 2005/0086177 A1 | 4/2005 | Anderson et al. |
| 2005/0091338 A1 | 4/2005 | de la Huerga |
| 2005/0116050 A1 | 6/2005 | Jei et al. |
| 2005/0137986 A1 | 6/2005 | Kean et al. |
| 2005/0211760 A1 | 9/2005 | Dewan et al. |
| 2006/0157563 A1 | 7/2006 | Marshall |
| 2006/0187052 A1 | 8/2006 | Hung |
| 2007/0152035 A1 | 7/2007 | Adams et al. |
| 2007/0175972 A1 | 8/2007 | Ringer |

FOREIGN PATENT DOCUMENTS

| | | |
|---|---|---|
| WO | 0188659 A2 | 11/2001 |
| WO | WO 2007/044144 A2 | 4/2007 |

OTHER PUBLICATIONS

PCT International Search Report and Written Opinion mailed May 14, 2009, International Application No. PCT/US2009/034714, 11 pages.

Australian Patent Application No. 2007248070, Examination Report dated May 11, 2010, 2 pages.

U.S. Appl. No. 11/381,630, filed May 4, 2006.

U.S. Appl. No. 11/381,630, Office Action dated Jun. 26, 2008, 11 pages.

U.S. Appl. No. 11/695,968, filed Apr. 3, 2007.

* cited by examiner

MANUFACTURING SYSTEM TO PRODUCE CONTACTLESS DEVICES WITH SWITCHES

BACKGROUND OF THE INVENTION

Contactless payment devices have become increasingly popular. These systems allow a consumer to effect payment at a retail point of sale quickly and efficiently.

A traditional sale transaction often involves a consumer presenting a credit card, debit card, gift card, or other kind of presentation instrument or payment device, which is "swiped" through a point-of-sale (POS) terminal. The merchant indicates the amount of the proposed purchase, and the POS terminal communicates information to a payment processing computer or system to obtain approval for the transaction. In a typical transaction, the communicated information includes a unique identifier read from the payment device and the amount of the proposed transaction. The payment processing system verifies (possibly after communicating with other systems) that the payment device is valid and is associated with enough credit or stored value to pay for the purchase.

Often, the consumer is required to enter a personal identification number or sign a document as part of the transaction. One of the reasons for these requirements is to increase the merchant's confidence that the customer at the cash register is actually the account holder authorized to make purchases, and not someone attempting to make a fraudulent purchase. While these measures do mitigate risk for the merchant and card issuer, they also take significant time and add to the complexity of making purchases. When the purchase is small and it is desirable to complete a transaction quickly, the added complexity and time burden may outweigh the small financial risk that a purchase is fraudulent. For example, requiring a customer signature at the drive-up window of a drive-through restaurant can seriously affect the throughput of the drive-through.

A "contactless" payment device enables non-cash payment without a physical connection between a consumer payment device and a POS device. For example, the contactless payment device may be a card, key fob, watch, a cellular telephone phone, or another kind of item that has a unique account identifier and is associated with value. The value may be in the form of stored value in an account, such as a checking account associated with a debit card, or may be in the form of credit. The payment device and the POS terminal can communicate without physical contact, often using a wireless method such as radio frequency (RF) communication, near field communication (NFC), a Bluetooth protocol, or a carrier-based mobile technology. To initiate communication, the customer taps the payment device on a contactless reader device associated with a POS terminal, or even simply waves the payment device in the vicinity of the contactless reader that is emitting radio frequency waves. The POS device nearly instantaneously detects the presence of the payment device and reads the account identifier from the payment device. If desired, an authorization check is performed and the transaction can be approved and finalized in seconds. For some transactions, no PIN or signature may be required. The customer can be on his or her way quickly and the merchant can begin another transaction with another customer.

One concern with contactless payment devices is that a person with a contactless reader device may be able to surreptitiously read (or "sniff") the account identifier or other account information stored on a contactless payment device and use the account information to make fraudulent purchases. It has been proposed that a contactless payment device include a switch such that reading information from the device is disabled unless a user of the device holds the switch in an enabling position. The device can then be used for payments when the switch is held, but cannot be sniffed otherwise because reading is normally disabled, such as when the device is carried in a user's pocket. A switch-operated payment device is described in U.S. patent application Ser. No. 11/327,840 of Kean and entitled "Information access control", the entire disclosure of which is incorporated herein by reference. A presentation instrument having a sensor input is described in U.S. patent application Ser. No. 11/381,360 of Beeson and entitled "RF presentation instrument with sensor control", the entire disclosure of which is incorporated herein by reference.

Radio frequency sensing of various credentials or other information is used in other applications as well. For example, a card, key fob, or other device may have a passcode or credential stored on it that allows entry into a building, allows access to a medical storage cabinet, or is used for some other kind of authorization. Similarly, information stored on the contactless device may provide identification of the person carrying the device, or the device may simply be used for information storage and retrieval. Sniffing of information from these kinds of devices is undesirable as well.

While a switch largely solves the problem of surreptitious sniffing, it creates a new problem. Because the device is normally disabled, the recording of necessary information on the device is hampered. The process of recording information or credentials on a device used for contactless payment or for other uses is sometimes called "personalization", especially when the device is used for payment and the stored information is an account credential, such as an account number or other account identifier. Machines normally used to perform personalization are not designed to actuate a switch.

BRIEF SUMMARY OF THE INVENTION

In one embodiment of the invention, a contactless device comprises circuitry comprising memory for storing information; a switch operably coupled to the circuitry, the switch having a first position and a second position; and a fusible link electrically coupled to the circuitry. When the fusible link is intact, wireless reading and writing of the information from and to the memory are enabled regardless of the switch position. After the fusible link has been parted, wireless reading of the information is enabled when the switch is in the first position and wireless reading of the information is disabled when the switch is in the second position. In some embodiments, when the fusible link is intact, an antenna is fully connected to the circuitry regardless of the switch position, and when the fusible link is parted, whether the antenna is fully connected to the circuitry is dependent on the switch position. In some embodiments, the switch and fusible link are connected in parallel. In some embodiments, the contactless device is a payment device and the information comprises an account credential. In some embodiments, the contactless payment device further comprises a second fusible link, the parting of which transforms the contactless payment device from a non-responsive state to a responsive state.

In another embodiment of the invention, a method comprises providing a contactless device comprising 1) circuitry that further comprises memory for storing information, 2) an intact fusible link electrically coupled to the circuitry, and 3) a switch operably coupled to the circuitry and having a first position and a second position. The contactless device is personalized by storing information in the circuitry, and the fusible link is parted. Parting the fusible link configures the contactless device so that wireless reading of information from the circuitry is enabled when the switch is in the first position and wireless reading of information from the circuitry is disabled when the switch is in the second position. In some embodiments, parting the fusible link comprises melting the fusible link by the application of electrical current. In some embodiments, the contactless device is placed in a non-responsive state after personalization. In some embodiments, placing the contactless device in the non-responsive state comprises storing a blocking code in a memory. In some embodiments, the method further comprises transforming the contactless device from the non-responsive state to a responsive state. In some embodiments, transforming the contactless device from the non-responsive state to the responsive state comprises parting a second fusible link. In some embodiments, transforming the contactless device from the non-responsive state to the responsive state comprises removing or replacing a blocking code stored in the memory comprised in the contactless device. In some embodiments, transforming the contactless device from the non-responsive state to the responsive state comprises transmitting an authenticating code to the contactless device. In some embodiments, the authenticating code is transmitted from a separate authenticating device. In some embodiments, transforming the contactless device from the non-responsive state to the responsive state is performed by an intended user of the contactless device. In some embodiments, the contactless device is a payment device and the information comprises an account identifier. In some embodiments, the information allows payment, access, or authorization.

In another embodiment of the invention, a system comprises a contactless payment device, the contactless payment device comprising 1) circuitry that further comprises memory for storing account information, 2) a switch operably coupled to the circuitry and having two positions such that wireless reading of account information from the memory is enabled when the switch is in the first position and wireless reading of account information from the memory is disabled when the switch is in the second position, and 3) a fusible link electrically coupled to the circuitry. Parting of the fusible link transforms the contactless payment device from a non-responsive state to a responsive state. The system also comprises a separate device for parting the fusible link. In some embodiments, the separate device is a sleeve, and parting the fusible link comprises inserting the contactless payment device into the sleeve.

In another embodiment of the invention, a system comprises a contactless payment device, the contactless payment device comprising 1) circuitry that further comprises memory for storing account information, and 2) a switch operably coupled to the circuitry and having two positions such that wireless reading of account information from the memory is enabled when the switch is in the first position and wireless reading of account information from the memory is disabled when the switch is in the second position. The system also comprises a separate authenticating device configured to wirelessly transmit a pre-arranged authenticating code to the contactless payment device. Upon receiving the authenticating code, the contactless payment device transforms from a non-responsive state to a responsive state. In some embodiments, the pre-arranged authenticating code is stored in the authenticating device. In some embodiments, the pre-arranged authenticating code is entered into the authenticating device by a user of the device.

In accordance with another example embodiment of the invention, a system comprises a contactless payment device comprising circuitry and a fusible link electrically coupled to the circuitry; a personalization machine configured to personalize the contactless payment device by storing identifying information in a memory comprised in the circuitry; and a module configured inline with the personalization machine, the module further configured to blow the fusible link in the contactless payment device.

DETAILED DESCRIPTION OF THE INVENTION

The present invention provides systems and methods for security of a contactless device. For the purposes of this disclosure, a contactless device is a device that stores information to be retrieved wirelessly through a contactless reader. The device may be a card or card-shaped, or may be any device storing credentials or other information. For example, a key fob, watch, cellular telephone, other portable electronic device, or nearly any other device may function as a contactless device used for payment, authorization, access, or information storage. A contactless payment device may be a presentation instrument such as a debit card, credit card, gift card, admission ticket, or other kind of instrument offered for payment by presentation. For the purposes of this disclosure, radio frequency or wireless communication may include radio frequency identification (RFID), a Bluetooth interface, a near field communication (NFC) interface, a carrier-based mobile technology, or another kind of wireless communication. Radio waves may be electromagnetic waves of any frequency or wavelength. Circuitry may include wiring, one or more integrated circuits, discrete components, or any combination of these. The circuitry may be digital, analog, or a combination of these. For the purposes of this disclosure, an account number may be a purely numerical value, or may include alphabetic characters, punctuation characters, or other characters.

Figure 1A:
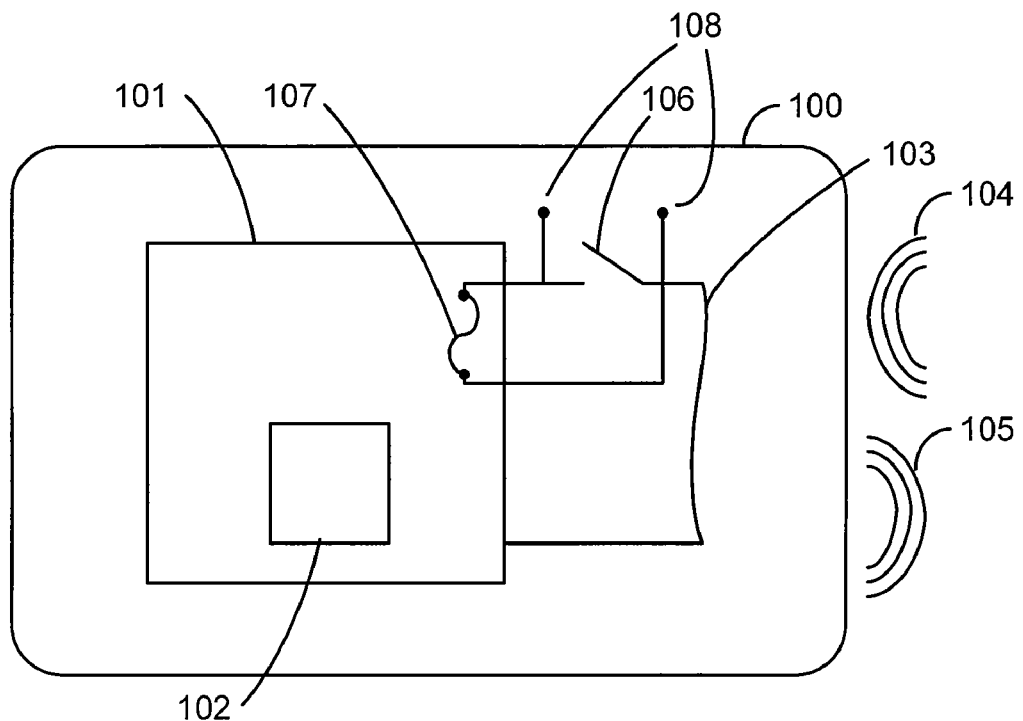
FIG. 1A shows a schematic diagram of a contactless device, in accordance with an example embodiment of the invention.

FIG. 1A shows a schematic diagram of a contactless device 100, in accordance with an example embodiment of the invention. Example contactless device 100 is a payment device in the form of a card similar to a credit or debit card. Contactless device 100 comprises circuitry 101, which includes memory 102 for storing information. Circuitry 101 may also comprise a microcontroller for initiating and processing commands. The information may be, for example, an account number of an account associated with payment device 100. An antenna 103 receives radio waves 104 from and transmits radio waves 105 to an external device. In some embodiments, circuitry 101 is powered by energy contained in radio waves 104. A switch 106 can be actuated from the outside of payment device 100. Switch 106 has an open position, in which its two terminals are not connected through the switch, and a closed position, in which its two terminals are connected through the switch. Preferably, switch 106 is a momentary membrane switch that can be actuated by a simple press from a user's finger or thumb. Various possible example configurations for switch 106 are described in U.S. Pat. No. 6,863,220 to Selker and entitled "Manually operated switch for enabling and disabling an RFID card", the entire disclosure of which is incorporated herein by reference.

Figure 2:
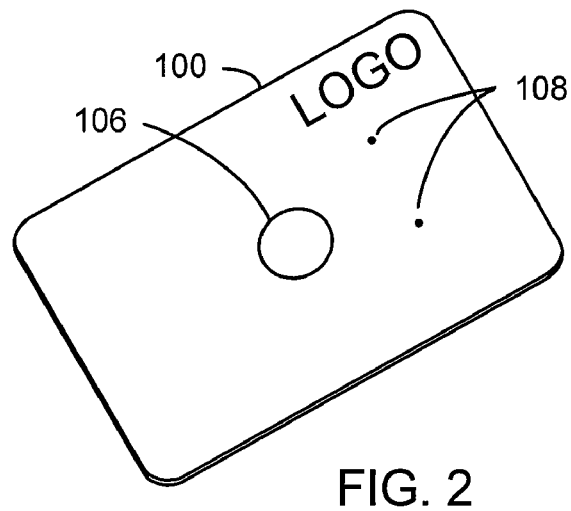
FIG. 2 shows a perspective view of the example contactless device of FIG. 1A, including a switch and electrical connection points.

Configured in parallel with switch 106 is fusible link 107. Fusible link 107 is internal to contactless device 100, and may be internal to circuitry 101. Electrical connection points 108 are electrically connected to the ends of fusible link 107, and are accessible on the outside of payment device 100. FIG. 2 shows a perspective view of example contactless device 100, with switch 106 and electrical connection points 108 visible.

At the time that contactless payment device 100 is manufactured, it may be identical to other devices similarly manufactured, without any distinguishing feature or memory contents. In order to enable use of contactless payment device 100 as a payment device, it is made unique, in a process called personalization. Personalization makes a particular payment or identification device uniquely identifiable with its owner. For a traditional card-type payment device, for example a credit or gift card, personalization may comprise embossing or printing a unique account identifier on the card, recording a unique account identifier on a magnetic strip on the card, or both. In an analogous process, during personalization of contactless payment device 100, a unique account identifier may be transmitted wirelessly to device 100 and stored in memory 102. Various personalization mechanisms may be used in combination. Memory 102 may comprise random access memory (RAM), read only memory (ROM), programmable read only memory (PROM), erasable programmable read only memory (EPROM), electrically erasable programmable read only memory (EEPROM), flash memory, magnetic storage, optical storage, other kinds of memory, or any of these in any combination. Memory 102 preferably comprises EEPROM, which is a kind of nonvolatile memory whose contents can be modified, and in which the unique account identifier is stored. The process of personalization is typically highly automated, and may typically occur at a high-volume production facility. More details about the personalization of contactless payment devices may be found in pending U.S. patent application Ser. No. 10/718,481 of Casto et al. and entitled "Automated preparation of radio-frequency devices for distribution", and pending U.S. patent application Ser. No. 10/911,979 of Kean et al. and entitled "Radio-frequency-device personalization", the entire disclosures of which are incorporated herein by reference.

Another step in making contactless payment device 100 ready to use for payments is called activation. Activation is the process of associating a particular personalized payment device with an account containing value or with a credit line. For example, if contactless payment device 100 is to be associated with a bank account and function as a debit instrument, the bank (or a processing company hired by the bank) records the account identifier stored in payment device 100 at personalization time, and records the fact that payment device 100 is associated with a particular bank account. Or if payment device 100 is to operate as a credit instrument, a credit issuer (or a processing company hired by the credit issuer) records the account identifier stored in payment device 100 at personalization time and records the fact that the particular payment device is associated with a particular credit account.

Once payment device 100 has been personalized and activated, it may be presented to a merchant for payment during a purchase transaction. Transaction approval happens in the usual way. That is, the merchant, using a contactless reader device, reads the unique account identifier from payment device 100 and transmits it along with details of the proposed transaction to a processor, which approves or denies the transaction depending on whether the associated account or credit line is sufficient to make the purchase.

While personalization and activation are terms often used with regard to payment devices, similar processes may occur with regard to contactless devices used for other purposes. For example, a contactless device to be used for access to a building may have a unique code written to it in a process analogous to personalization of a payment device. In a process analogous to activation of a payment device, the unique code may be recorded in a database as belonging to a device holder who is authorized to enter the building. For the purposes of this disclosure, personalization includes writing unique information onto a contactless device whether or not the device is to be used for payment.

At some stage between personalization of device 100 and its eventual use, fusible link 107 is parted, or "blown". In example payment device 100, fusible link 107 is an electrically-conductive element wired in parallel with switch 106. Fusible link 107 may be made, for example, of a readily-oxidizable metal, such as titanium, tungsten, tantalum, copper, or aluminum. Fusible link 107 is shown as being part of circuitry 101, and may be fabricated as part of an integrated circuit using micro electro-mechanical systems (MEMS) techniques. Methods for forming a MEMS fusible link are described in U.S. patent application Ser. No. 10/546,110 of Van Kampen et al. and entitled "Micro fuse", the entire disclosure of which is incorporated herein by reference. Alternatively, fusible link 107 may reside outside of any integrated circuit and may be connected using conventional wiring techniques. As long as fusible link 106 remains intact, the terminals of switch 106 remain electrically connected, regardless of the position of switch 106. Therefore, antenna 103 remains fully connected to circuitry 101, and payment device 100 remains responsive to power and data communicated over radio waves 104. Device 100 can then be personalized using standard equipment, with no need to actuate switch 106.

Figure 1B:
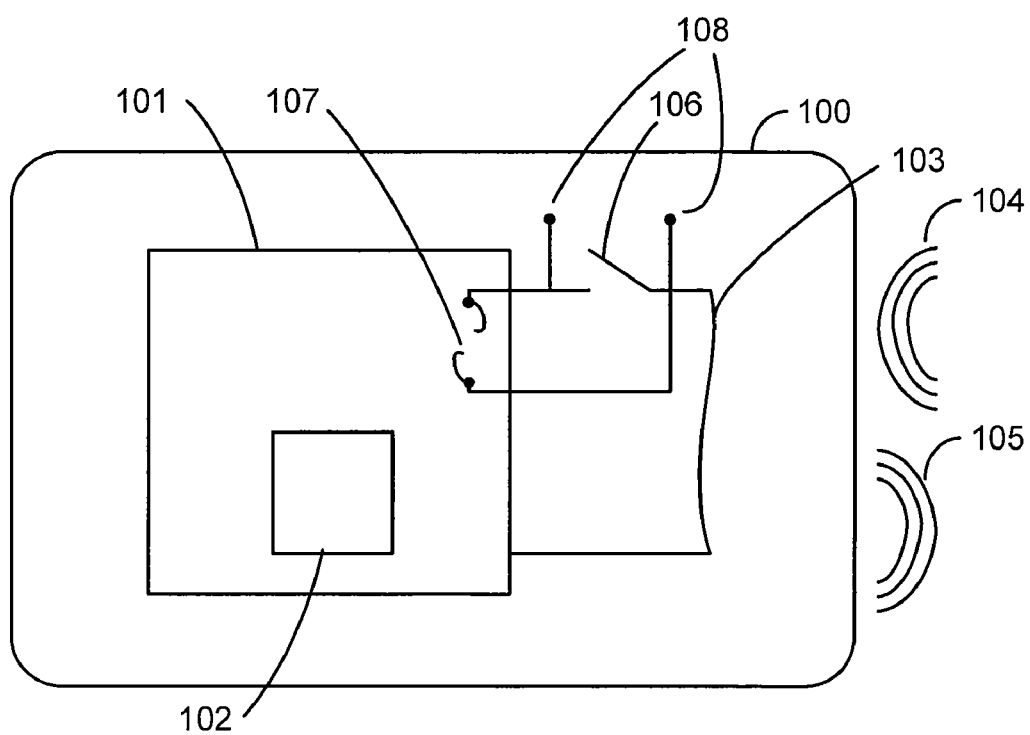
FIG. 1B shows the contactless device of FIG. 1A, with a fusible link parted.

Once personalization of device 100 is complete, and preferably before device 100 is shipped, fusible link 107 is blown, for example by passing sufficient electrical current through it to cause it to melt and part. FIG. 1B shows contactless payment device 100 after fusible link 107 is blown. Once fusible link 107 is parted, the terminals of switch 106 are electrically connected only when switch 106 is in the closed position. When switch 106 is in the open position, the connection between circuitry 101 and antenna 103 is interrupted, and device 100 becomes disabled. The device can then be safely shipped and carried with minimal risk of having its contents sniffed. Preferably, an automated machine passes current through fusible link 107 by connecting a current source to electrical connection points 108. When one of two connections between antenna 103 and circuitry 102 is interrupted by blowing of fusible link 107 as is shown in FIG. 1B, the antenna may be said to be partially disconnected from circuitry 102, or not fully connected to circuitry 102.

Figure 3:
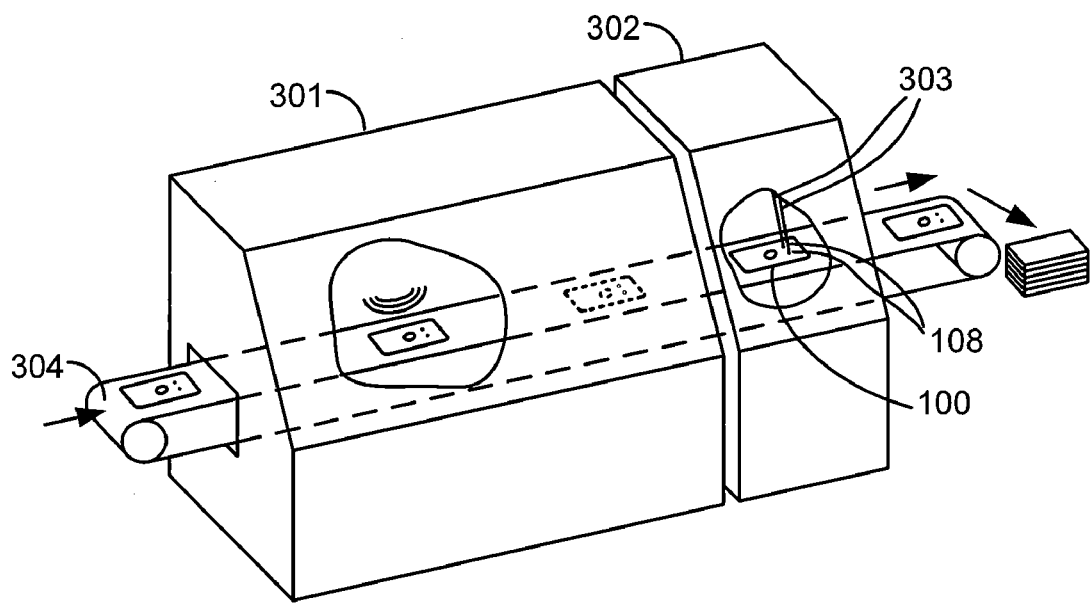
FIG. 3 shows a schematic view of a system for personalizing payment devices and for blowing a fusible link in each payment device.

Conveniently, the automated machine for passing current through fusible link 107 may be a module, station, or accessory adapted to a high-volume personalization machine. FIG. 3 shows a schematic view of a system for personalizing payment devices and for blowing a fusible link in each payment device. In the system of FIG. 3, payment devices such as payment device 100 enter the system in an unpersonalized state. That is, each payment device entering the system does not yet have unique account information stored on it. Personalization machine 301 performs the task of writing or storing unique identifying information on each payment device. Although other options are possible, it is preferred that personalizing each payment device comprises using a radio signal to power the payment device and to communicate identifying information to the payment device, which is then stored in a memory on the payment device. Other tasks that may occur during personalization, in place of or in addition to storing identifying information, include printing identifying information on the payment device, embossing an account identifier onto a card, writing identifying information onto a magnetic stripe on a card, or other tasks. High-volume machines for personalizing payment devices are known in the art, exemplified by the model DC9000 Card Issuance System available from Datacard Group of Minnetonka, Minn., USA.

Such high-volume machines for personalization may be designed for modular expansion, so that the machine may be adapted to specific situations and upgraded to accommodate new technologies. In the system of FIG. 3, a module 302 has been configured inline with and integrated with personalization machine 301. Being inline with personalization machine 301 means that the personalization machine 301 and module 302 share a path along which a payment device is conveyed through the system. In FIG. 3, the shared path is represented schematically by conveyor 304, but other conveyance means may be used, such as guide rails, friction drive rollers, or other means. Module 302 is configured to blow one or more fusible links on payment devices passing through it. For example, a card-based payment device such as payment device 100 may pass from personalization machine 301 through module 302. Electrical connection points 108 on payment device 100 are exposed on the surface of payment device 100. Preferably, module 302 comprises electrodes, brushes, probes, or other connecting devices 303 configured to make contact with connection points 108 as payment device 100 traverses module 302. Connecting devices 303 are energized by a source of electrical current, and cause fusible link 107 to part upon contact with connection points 108.

Many variations are possible in contactless payment device 100 within the scope of the appended claims. For example, a payment device in accordance with an embodiment of the invention need not be a card or card-shaped. The components of contactless payment device 100 may be embedded in a key fob, a watch, a cellular telephone, or any other kind of device that can be associated with value. Switch 106 was shown and described above as a normally-open switch, and payment device 100 was described as enabled by closing switch 106. Embodiments may be envisioned where in a normally-closed switch is used and the payment device in which it is used is enabled when the switch is opened.

If a payment device comprising a fusible link is to be shipped or mailed to a user after personalization, additional security measures may be taken to guard against malfeasance that may occur in the mail stream. For example, an unscrupulous carrier may learn that a personalized payment device is in his or her possession, sniff the account information from it (with the switch actuated), wait for the account to become activated, and then use the information to make fraudulent purchases. This kind of fraud may be avoided if the payment device can be shipped in a non-responsive state, and transformed into a responsive state by the intended recipient of the device. This can be accomplished in various ways.

Figure 4:
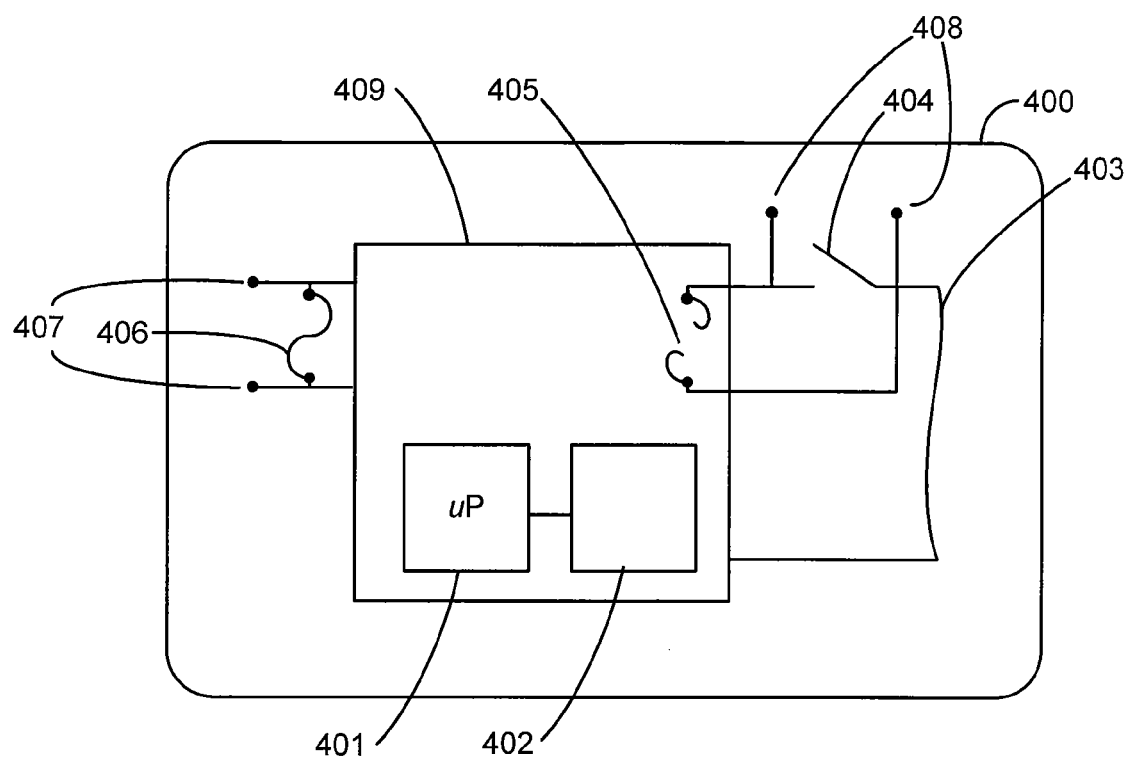
FIG. 4 shows a schematic view of a contactless device in accordance with another example embodiment of the invention.

FIG. 4 shows a schematic view of a contactless payment device 400 in accordance with another example embodiment of the invention. In this embodiment, payment device 400 is a "smart card" device, comprising circuitry 409, which further comprises a microprocessor 401. Circuitry 409 also includes memory 402 for storing a unique account identifier and other information such as program instructions for microprocessor 401, and circuitry for communicating wirelessly. Microprocessor 401 has various input/output capabilities. An antenna 403 enables power transfer to circuitry 409 through radio waves, and also enables bidirectional wireless communication with external devices. A switch 404 and fusible link 405 are constructed similarly to switch 106 and fusible link 107 in payment device 100, and perform similar functions. As long as fusible link 405 is intact, switch 404 is extraneous, and antenna 403 remains fully electrically connected to circuitry 409. Once fusible link 405 is blown or parted, antenna 403 is fully connected to circuitry 409 only when switch 404 is closed. Fusible link 405 is shown as parted in FIG. 4.

Also comprised in payment device 400 is an additional fusible link 406. Sets of electrical connection points 407 and 408 connect to the terminals of fusible links 406 and 405 respectively, and are exposed on the surface of device 400. In this example embodiment, upon the completion of personalization, microprocessor system 401 records, preferably in memory 402, the fact that personalization has been completed. Microprocessor 401 can also sense, using simple circuitry not shown, whether link 406 is intact. As long as personalization has not been completed, payment device 400, under control of microprocessor 401, remains fully responsive to radio-frequency communications (as long as fusible link 405 or switch 404 connects antenna 403) so that personalization may occur.

Once personalization is complete, the responsiveness of payment device 400 depends on the state of fusible link 406. If personalization is complete and link 406 is intact, microprocessor system 401, according to its instructions stored in memory 402, simply refuses to respond to any request for account information. If personalization is complete and fusible link 406 is parted, microprocessor system 401 recognizes this state, and payment device 400 is responsive to radio-frequency communications (when switch 404 connects antenna 403). This arrangement may be used as follows to provide security for payment device 400 in the mail stream.

In this example embodiment, payment device 400 is manufactured with both fusible links 405 and 406 intact. With both of links 405 and 406 intact and personalization incomplete, device 400 is responsive and can be personalized and the contents of memory 402 verified for correctness. After personalization and verification, fusible link 405 is blown, through connection points 408. Link 406 is left intact. The parting of fusible link 405 enables switch 404 to control the connection of antenna 403 to the other device circuitry. But with link 406 intact, device 400 is non-responsive to radio-frequency communication regardless of the state of switch 404. Microprocessor system 401 recognizes this state by noting that fusible link 406 is intact and memory 402 records that personalization has been completed. In this state, as shown in FIG. 4, the device can be safely shipped.

Figure 5:
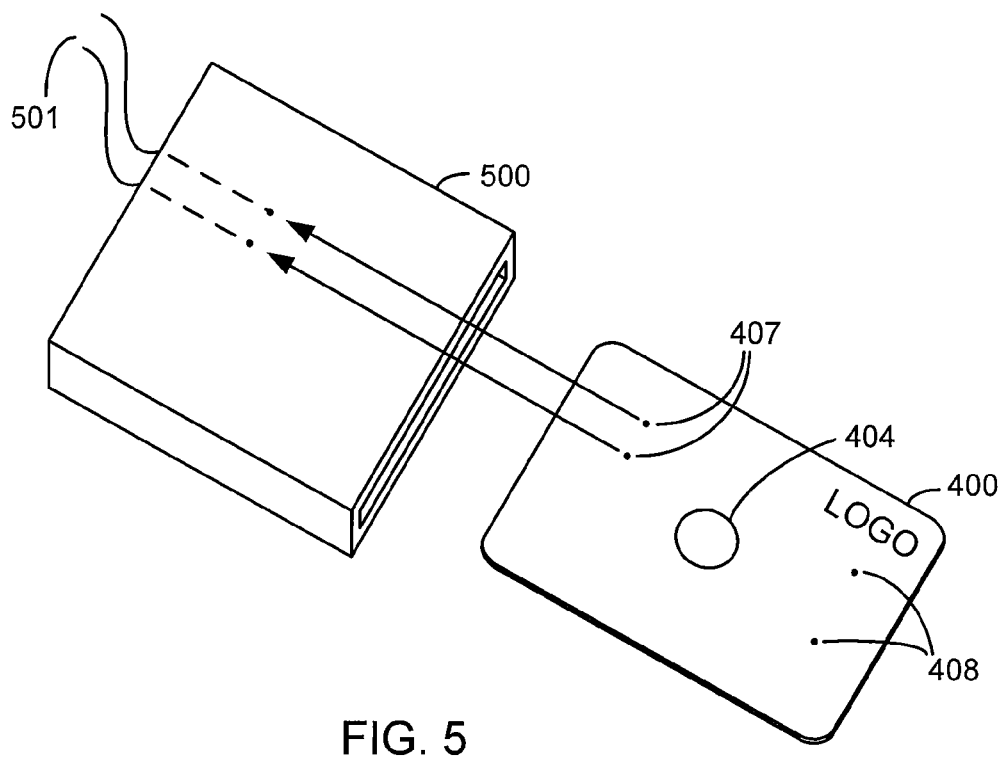
FIG. 5 shows a perspective view of the contactless device of FIG. 4, and a sleeve device, in accordance with an example embodiment of the invention.

FIG. 5 shows a perspective view of the payment device of FIG. 4, and a sleeve device 500, in accordance with an example embodiment of the invention. Sleeve device 500 is shipped separately to the intended recipient of payment device 400. The recipient places payment device 400 in sleeve device 500, which is designed to blow the remaining fusible link 406. Once fusible link 406 is blown, microprocessor system 401 recognizes this fact and once again begins responding to requests for account information. In this way, payment device 400 is shipped in a non-responsive state, and the intended user of payment device 400 transforms payment device 400 into a responsive state. Security is enhanced because any person wishing to sniff the account information from device 400 before the intended recipient receives it must be in possession not only of payment device 400 and a contactless reader device, but also must be in possession of sleeve device 500 and knowledge of how to use it, making the task of sniffing information more difficult. Preferably, sleeve device 500 includes a connection 501 to a source (not shown) of external power sufficient to blow fusible link 406 through connection points 407. Alternatively, sleeve device 500 may be powered by a battery.

For the purposes of this disclosure, a non-responsive state is one in which a payment device such as device 400 is configured to withhold a response to radio frequency communication, for example by refusing to divulge stored account information, even when the device is powered and an enabling switch such as switch 404 is be actuated. A responsive state is one in which the payment device is configured to provide a response when certain prerequisites are met, such as provision of power and actuation of an enabling switch, even though the prerequisites are not yet met.

Figure 6:
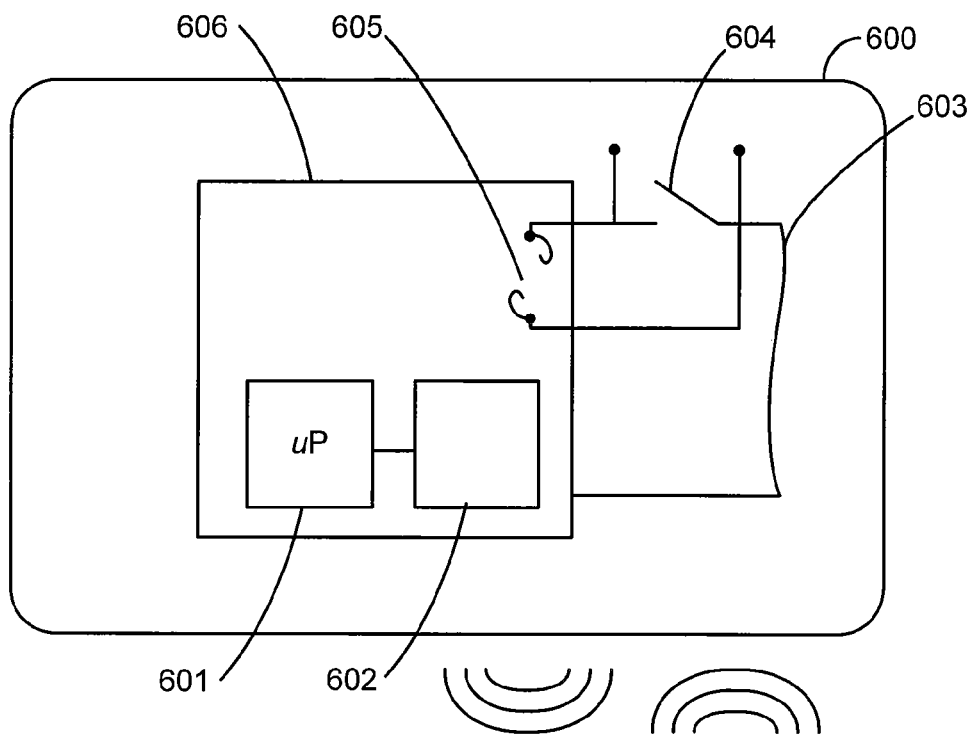
FIG. 6 shows a contactless device in accordance with another example embodiment of the invention.

FIG. 6 shows a contactless payment device 600 in accordance with another example embodiment of the invention. In this embodiment, payment device 600 comprises circuitry 606, which further comprises a microprocessor 601. Circuitry 606 also includes memory 602 for storing a unique account identifier and other information such as program instructions for the microprocessor 601, and circuitry for communicating wirelessly. An antenna 603 enables power transfer to circuitry 606 through radio waves, and also enables bidirectional wireless communication with external devices. A switch 604 and fusible link 605 are constructed similarly to switch 106 and fusible link 107 in payment device 100, and perform similar functions. As long as fusible link 605 is intact, switch 604 is extraneous, and antenna 603 remains fully electrically connected to circuitry 606. Once personalization is complete and fusible link 605 is blown or parted, antenna 603 is fully connected to circuitry 606 only when switch 604 is closed. In FIG. 6, fusible link 605 is shown as having been blown.

During personalization of device 600, a blocking code is written into memory 602. The blocking code may be simply a pre-determined value written to a pre-determined location in memory 602. The blocking code indicates that device 600 has been personalized, but not yet transformed by a user into a responsive state. Instructions stored in memory 602 configure microprocessor system 601 to remain non-responsive when the blocking code is present. That is, payment device 600, under the control of microprocessor system 601, may recognize when a reader device is attempting to read account information from payment device 600 but refuse to divulge the information, even if switch 604 is actuated. Payment device 600 is further configured to remain non-responsive until a pre-arranged authenticating code is transmitted to it.

Figure 7:
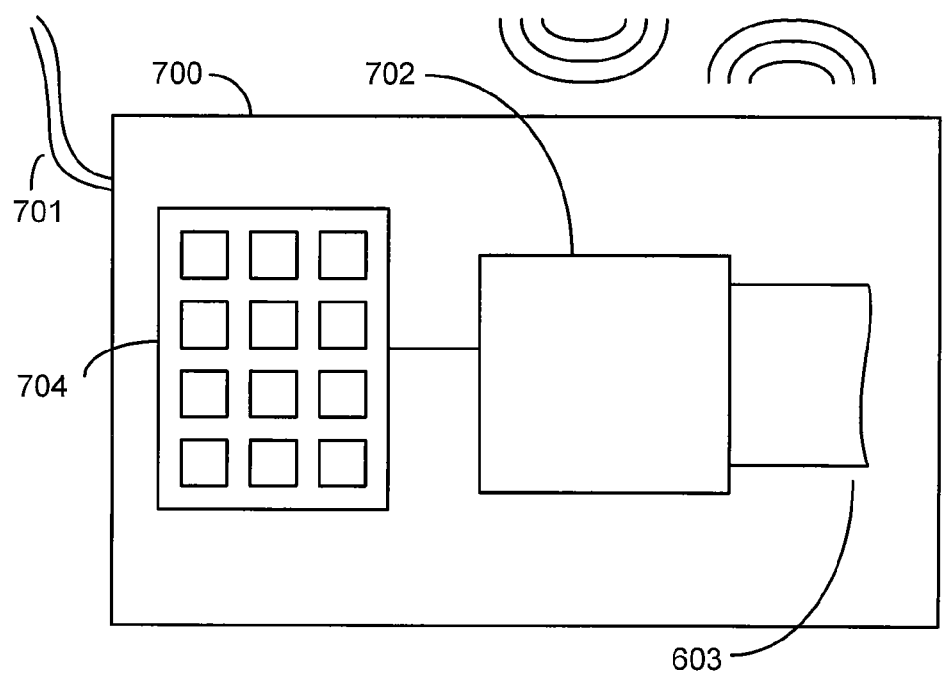
FIG. 7 shows an authenticating device for use with the contactless device of FIG. 6, in accordance with an example embodiment of the invention.

FIG. 7 shows an authenticating device 700 for use with payment device 600, in accordance with an example embodiment of the invention. Authenticating device 700 is configured to transmit the authenticating code to payment device 600. Authenticating device 700 connects 701 to an external source of power, or may be battery operated. Authenticating device 700 comprises circuitry 701 and antenna 703, configured to transmit wirelessly to payment device 600. The authenticating code may be stored in authenticating device 700, or may optionally be entered into device 700 by a user, for example using keypad 704. The authenticating code may be information likely to be known only to the intended recipient of the payment device, for example, a pre-arranged password or personal identification number, the recipient's birth date, a portion of the recipient's social security number, or some other piece of information.

Authenticating device 700 and payment device 600 may be mailed or otherwise delivered separately to an intended recipient user. If the user will enter the authenticating code using keypad 704, the authenticating code may also be sent separately. The user powers up authenticating device 700, enters the authenticating code if necessary, actuates switch 604 on payment device 600, and brings payment device 600 within communication range of authenticating device 700. Payment device 600 recognizes that the correct authenticating code is being transmitted to it, and removes or replaces the blocking code in memory 602. Because the blocking code is no longer in memory 602, payment device 600 is free to respond to requests for its unique account information. In this way, payment device 600 may be safely shipped in a non-responsive state, and the intended user of payment device 600 transforms payment device 600 into a responsive state. Security is enhanced because a person wishing to sniff account information from payment device 600 during shipment must be in possession of not only payment device 600 and a contactless reader device, but also of authentication device 700, and in some cases, must also know the unique authentication code. Surreptitiously obtaining all of these is more difficult than obtaining payment device 600 alone, so sniffing of account information from payment device 600 during transit is made more difficult.

While the invention has thus far been described primarily in the context of a payment device storing an account credential such as an account identifier, it is to be understood that the claims are not limited to this application. The information stored on a contactless device according to an embodiment of the invention may be used for authentication, identification, access, or for another purpose, or the contactless device may simply be used for data storage.

The invention has now been described in detail for the purposes of clarity and understanding. However, those skilled in the art will appreciate that certain changes and modifications may be practiced within the scope of the appended claims.

What is claimed is:

1. A contactless device, comprising:
   circuitry comprising memory for storing information;
   a switch operably coupled to the circuitry, the switch having a first position and a second position; and
   a fusible link electrically coupled to the circuitry;
   wherein when the fusible link is intact, wireless reading and writing of the information from and to the memory are enabled regardless of the switch position; and
   wherein after the fusible link has been parted, wireless reading of the information is enabled when the switch is in the first position and wireless reading of the information is disabled when the switch is in the second position.

2. The contactless device of claim 1, further comprising:
   an antenna for wirelessly receiving and transmitting information to and from the circuitry, and
   wherein when the fusible link is intact, the antenna is fully connected to the circuitry regardless of the switch position; and after the fusible link has been parted, the antenna is fully connected to the circuitry when the switch is in the first position, and the antenna is at least partially disconnected from the circuitry when the switch is in the second position.

3. The contactless device of claim 1, wherein the fusible link is wired in parallel with the switch.

4. The contactless device of claim 1, wherein the contactless device is a payment device, and wherein the information comprises an account credential.

5. The contactless device of claim 1, wherein the information comprises a credential allowing access, a credential allowing authorization, or identification information.

6. The contactless device of claim 1, further comprising a second fusible link electrically coupled to the circuitry, the parting of which transforms the contactless device from a non-responsive state to a responsive state.

7. A method, comprising:
   providing a contactless device comprising 1) circuitry that further comprises memory for storing information, 2) an intact fusible link electrically coupled to the circuitry, and 3) a switch operably coupled to the circuitry and having a first position and a second position;
   personalizing the contactless device by storing information in the circuitry; and
   parting the fusible link, thereby configuring the contactless device so that wireless reading of the information from the memory is enabled when the switch is in the first position and wireless reading of the information from the memory is disabled when the switch is in the second position.

8. The method of claim 7, wherein parting the fusible link comprises melting the fusible link by the application of electrical current.

9. The method of claim 7, further comprising, after personalizing the contactless device, placing the contactless device in a non-responsive state.

10. The method of claim 9, wherein placing the contactless device in a non-responsive state further comprises storing a blocking code in the memory comprised in the contactless device.

11. The method of claim 9, further comprising transforming the contactless device from the non-responsive state to a responsive state.

12. The method of claim 11, wherein transforming the contactless device from the non-responsive state to the responsive state comprises parting a second fusible link comprised in the contactless device.

13. The method of claim 11, wherein transforming the contactless device from the non-responsive state to the responsive state comprises removing or replacing a blocking code stored in the memory comprised in the contactless device.

14. The method of claim 11, wherein transforming the contactless device from the non-responsive state to the responsive state comprises wirelessly transmitting an authenticating code to the contactless device.

15. The method of claim 11, wherein transforming the contactless device from the non-responsive state to the responsive state comprises wirelessly transmitting an authenticating code to the contactless device from a separate authenticating device.

16. The method of claim 11, wherein transforming the contactless device from the non-responsive state to the responsive state is performed by an intended user of the contactless device.

17. The method of claim 7, wherein the contactless device is a payment device, and the information comprises an account identifier.

18. The method of claim 7, wherein the information allows payment, access, or authorization.

19. A system, comprising:
   a contactless payment device, the contactless payment device comprising 1) circuitry that further comprises memory for storing account information, 2) a switch operably coupled to the circuitry and having two positions such that wireless reading of account information from the memory is enabled when the switch is in the first position and wireless reading of account information from the memory is disabled when the switch is in the second position, and 3) a fusible link electrically coupled to the circuitry, the parting of which fusible link transforms the contactless payment device from a non-responsive state to a responsive state; and
   a separate device for parting the fusible link.

20. The system of claim 19, wherein the separate device is a sleeve, and wherein parting the fusible link comprises inserting the contactless device into the sleeve.

21. A system, comprising:
   a contactless payment device comprising circuitry and a fusible link electrically coupled to the circuitry;
   a personalization machine configured to personalize the contactless payment device by storing identifying information in a memory comprised in the circuitry; and
   a module configured inline with the personalization machine, the module further configured to blow the fusible link in the contactless payment device.

* * * * *